United States Patent

Strauven

[11] 3,925,210
[45] Dec. 9, 1975

[54] FILTERING DEVICE
[75] Inventor: Kurt Strauven, Bonn, Germany
[73] Assignee: Wasser-Sand-Forschungs-U. Vertriebs G.m.b.H., Bonn, Germany
[22] Filed: Feb. 7, 1974
[21] Appl. No.: 440,551

[30] Foreign Application Priority Data
Feb. 20, 1973 Switzerland.................... 2402/73

[52] U.S. Cl................................ 210/335; 210/450
[51] Int. Cl.² ..................................... B01D 35/02
[58] Field of Search .......... 210/301, 300, 335, 339, 210/450

[56] References Cited
UNITED STATES PATENTS

| | | | |
|---|---|---|---|
| 639,471 | 12/1899 | Van Alstine....................... | 210/339 |
| 1,141,744 | 6/1915 | Woods................................ | 210/339 |
| 1,304,124 | 5/1919 | Trumble......................... | 210/335 X |
| 2,381,627 | 8/1945 | Thompson....................... | 210/335 X |
| 2,411,341 | 11/1946 | Shepard......................... | 210/335 X |

Primary Examiner—Frank A. Spear, Jr.
Attorney, Agent, or Firm—Edwin E. Greigg

[57] ABSTRACT

A filtering device for providing potable water includes a multipart housing and a plurality of filtering discs. The filtering discs are removably disposed between the inlet and outlet of the device so as to be readily replaced. The filtering discs are spaced at a distance from one another to form respective storage volumes between the discs. Additional storage volumes are provided respectively downstream from the last disc and upstream from the first disc. The storage volumes between the discs and the storage volume upstream from the first disc reduce the concentration of pollutants retained on the filtering surfaces of the discs.

8 Claims, 3 Drawing Figures

FILTERING DEVICE

BACKGROUND OF THE INVENTION

This invention relates to a filtering device having a multipart housing and a plurality of filtering discs. The present invention relates, more particularly, to a filtering device, especially suitable for the purpose of filtering potable water, the device including a multipart housing and a plurality of filtering discs removably disposed between the inlet and outlet of the device so as to be readily replaceable.

The production of potable water necessitates the prior treatment of the raw, naturally occurring water which is polluted in most cases.

In general, three process steps are required and are performed in sequence. At first the water is cleaned by physical means, in order to remove undissolved floating particulate matter together with the bacteria adhering thereto. In large installations this occurs in settling vats; in small installations it occurs by means of a filter during the passage of the fluid therethrough. Subsequently, the water is treated by chemical means, in order to remove dissolved matter and, in particular, in order to remove iron and manganese. Sometimes the water also is subjected to treatment in order to soften the water. In this work process, the water is normally sprayed over piles of coke or clinker in order that the oxygen contained in the air may act to transform dissolved matter into an undissolved and precipitable form. The optional removal of the water hardness due to carbonates is effected preferentially be rechargeable ion exchangers. Finally, the water is sterilized in order to remove or to kill any remaining bacteria. For this purpose, the water may be treated with ozone or chlorine in order to kill the bacteria, this step being usual whenever large quantities of water are involved. A special bacteria filter may be used for the sterilization of smaller quantities of water.

Potable water preparation systems, in which the above-described process steps are conducted in separate installations and on a large technical scale are generally known. Filter devices with small capacity, in which these process steps are conducted in several filter chambers are also known. Each of the known filter chambers contains a filter made up of granular matter of different size. The individual filter chambers are stacked on top of one another to make up a filter tower. Raw water is introduced into the top of the filter tower and the resulting clean water is removed from the bottom of the tower. Portable filter systems, which have several adjacent filter discs to effect sequentially the different process steps, are also known. The filtering speed, i.e. the volume of filtered water per filter disc surface area, is very small in these known portable devices, because of the high throughput resistance and the small effective surface area of the filter discs. For these reasons, the water to be filtered is generally pumped into such devices under relatively high pressure, or the filtered water is aspirated under a considerably reduced pressure.

The most important disadvantage of the known portable filter devices, however, is not the low filtering speed; rather, the filtering discs, which are adjacent to one another and are pressed together, are too rapidly clogged or pluggged up by the retained pollutants, which greatly reduces their practical utility.

The foregoing objects, as well as others which are to become clear from the text below, are achieved in accordance with the present invention by providing a filtering device which includes a multipart housing having at least one inlet and at least one outlet. A plurality of filtering discs are disposed within said housing at a distance from each other to form at least one storage volume. As a consequence of this arrangement, the concentration of pollutants retained on filtering surfaces of at least one of the filtering discs is reduced during operation.

It is a salient feature of a filtering device, according to the invention, that the adjacent filtering discs are spaced from each other in order to form respective storage volumes which reduce the concentration of pollutants retained on the filtering surfaces of the discs.

The new filtering device makes it possible to produce bacteriologically acceptable, sterile, non-toxic potable water for human consumption which can be produced from very badly polluted raw water with the use of previously unattainable small outside dimensions and weight of the filtering device. Potable water free of A-B-C warfare substances can be provided. The filtering device is therefore particularly suitable as a portable device which can be used in cases of emergency and catastrophies. The unavoidable fouling of the filter discs due to the trapped pollutants can be sharply reduced by the storage volumes disposed between the filtering discs so that the amount of water within the device which can be filtered with one set of filters corresponds to a ration suitable for several days; this substantially increases the survival probability of people who are completely removed from any potable water supply system.

DESCRIPTION OF THE PREFERRED EMBODIMENTS

Figure 1:
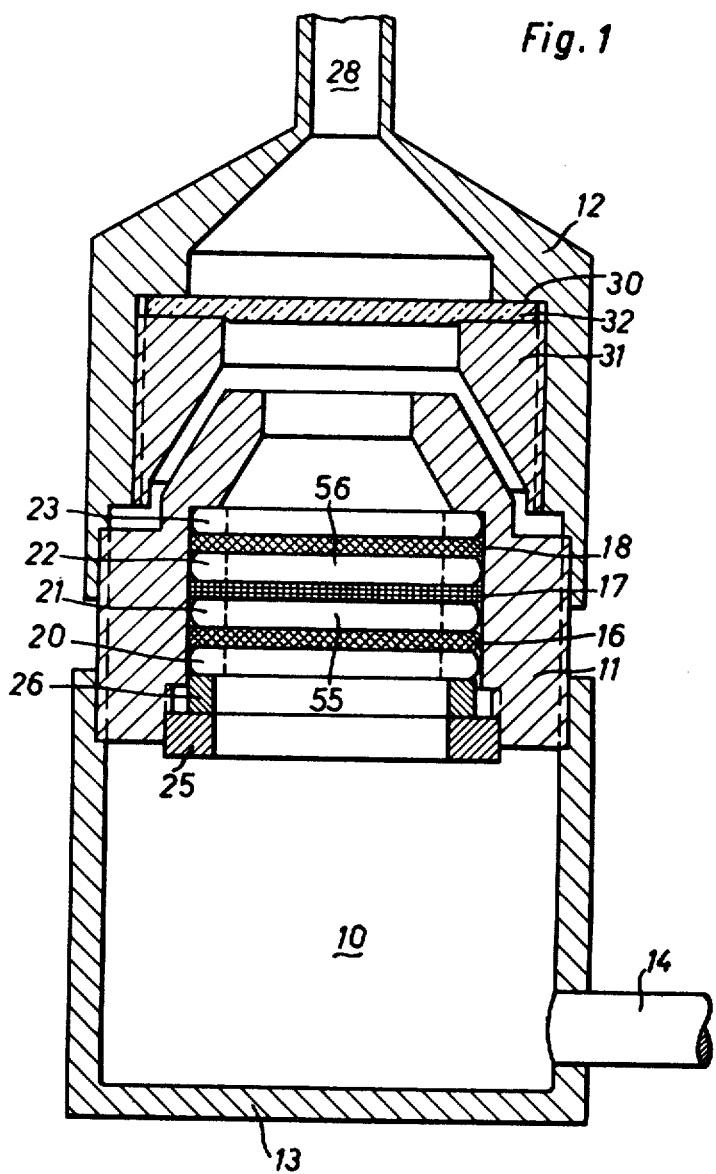
FIG. 1 is a diagrammatic representation of a preferred embodiment of a filtering device according to the present invention, the device being shown in longitudinal cross section.

As shown in FIG. 1, a novel filtering device according to the present invention includes a multipart type housing which may be screwed together to be pressure tight. The filtering device includes a cup-shaped influx container 10 having an open end, a filtering disc holder 11 open at both of its ends and an open-ended effluent member 12 having an outlet stud or conduit 28. The inlet container 10 has a suitably flat bottom 13 defining a surface usable for standing the filtering device upright and a laterally disposed inlet stud or conduit 14. Because the raw water to be filtered is preferably admitted under several atmospheres pressure into the influx container 10, the inlet stud or conduit 14 is formed in such a manner that a suitable hose or a pipe connection, suitable for the pressure expected to be encountered, may be fastened to the stud or conduit 14.

The open end of the cup-shaped influx container 10 is provided with threads and receives the screwed-in filter disc holder 11. The filter disc holder 11 is developed as a cylindrical tube into which several filtering discs 16, 17 and 18 are inserted. Special sealing-and-spacing rings 21 and 22, which are to be described in more detail hereinafter, are disposed respectively between the filtering discs 16 and 17, and the filtering discs 17 and 18. Similar sealing-and-spacing discs 20 and 23 are disposed respectively upstream from the filtering disc 16 and downstream from the filtering disc 18. The sealing-and-spacing rings are provided in order to separate the filtering discs 16, 17 and 18 from one another by a predetermined distance or distances and, at the same time, to prevent water to be filtered from flowing around the filtering discs 16, 17 and 18. An annular nut 25 is screwed into the filtering disc holder 11 adjacent to and in contact with a metal or hardened thermoplastic ring 26 which contacts the lowestmost sealing-and-spacing ring 20. The nut 25 compresses the filtering discs 16, 17 and 18 and the sealing-and-spacing rings 20, 21, 22 and 23 to the required pressure. In the illustrated embodiment of the filtering device, the metal spacing ring 26 is placed in between the annular nut 25 and the lowestmost sealing-and-spacing ring 20, the ring 20 being upstream from all of the filtering discs 16, 17 and 18. The spacing ring 20 makes it possible to use the same filter disc holder 11 for filtering discs having different thicknesses or, if desired, to use a different number of filtering discs at different times.

The top end of the filter disc holder 11 is equipped with the effluent member 12. A portion of the effluent member 12 is cylindrical in the vicinity of the filtering disc holder 11 and another portion which is spaced from the holder 11 has a conical taper towards its top end. The stud or conduit 28 through which the filtered water flows out is fixed to the top of the effluent member 12. A hose or a bent pipe (not shown) is preferably attached to the effluent stud or conduit 28, their openings preferably pointing downwardly in order to facilitate removal of the filtered water. Within the interior of the effluent member 12 at the transition from the cylindrical portion to the conical portion, a shoulder bearing surface 30 is provided, against which a further filtering disc 32 is pressed with the aid of a cylindrical member 31 having a divergent area which is screwed into the effluent member 12.

The individual parts of the filtering device described, with the exception of the filtering discs 16, 17, 18 and 32, can be made of a metal, preferably in the form of light metal castings, or a hardened, thermoplastic synthetic material. In a preferred embodiment, the sealing-and-spacing rings 20, 21, 22 and 23 are pressed of a thermosetting plastic.

The described embodiment has the advantage that it can be readily and easily taken apart, making it possible even for the layman to clean the filtering device and to insert fresh filter discs, as may be required.

In a tested filtering device, a total of four filtering discs were used. The first filtering disc 16 was provided for filtering the large mechanical pollutants expected to be encountered and undissolved suspended matter. The filtering disc 16, as is preferable, contained an asbestos lattice, enriched with a diatomaceous earth. The median pore diameter of the filtering disc 16 was, for example, 20 microns. The second filtering disc 17 was developed as an adsorption filter and contained, for example, a cellulose lattice, whose fibers were coated with activated charcoal. The pore diameter was, as is preferred, smaller than 10 microns. The third filtering disc 18 was intended for sterilization. It consisted of pretreated asbestos fibers, which form an effective adhesion material. The pore diameter of the filter 18, like filter 17, was, as preferred, smaller than 10 microns. The final filtering disc 32 served as a bacteria filter. For this purpose a commercially available nylon microsieve, having a pore diameter of less than 0.2 microns, was used.

As mentioned above, a salient feature of the novel filtering device according to the present invention, is that the filtering discs are disposed spaced apart from each other. This disposition has the effect that the material trapped by the filtering discs is deposited in a storage volume, for example, volumes 55, 56, which precedes the particular filtering disc and which is defined in longitudinal extend by a respective one of the sealing-and-spacing rings 21 and 22. In this manner, the otherwise rapid clogging of the front surface, in the sense of the stream direction, or of the pores of the filtering discs 16, 17 and 18 by the removed material can be effectively prevented and the useful life of these filters extended. It is a matter of experience that this effect is best achieved when the separation between two filtering discs is approximately equal to from 1.5 to about 1.8 times the thickness of the most downstream one of the discs 16, 17 and 18 in the sense of the stream direction.

Figure 2:
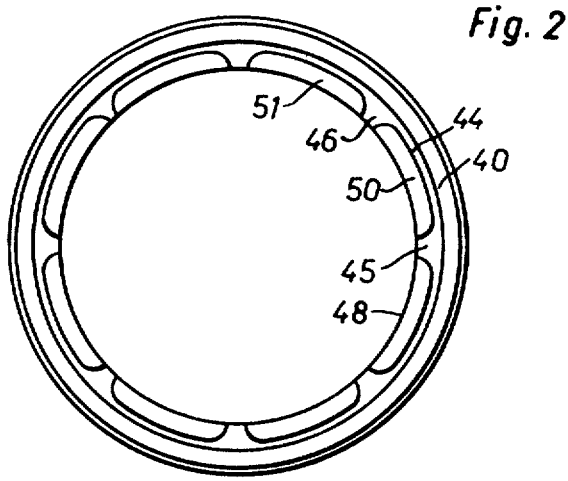
FIG. 2 is a top plan view of a sealing-and-spacing ring suitable for use in the filtering device of FIG. 1.
Figure 3:
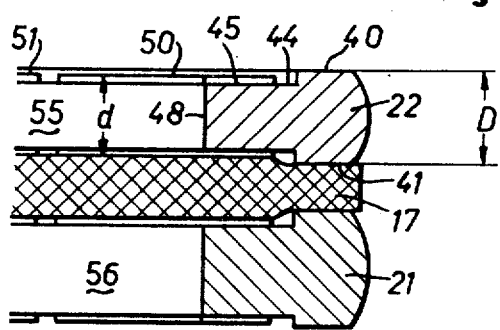
FIG. 3 is an enlarged view of a section through the edges of two sealing-and-spacing rings and of a filtering disc lying therebetween according to a feature of the present invention.

A particularly suitable embodiment of the sealing-and-spacer rings for the described filter device is shown in FIGS. 2 and 3. Two front surfaces of the ring are recessed so that the thickness D in the region of the outer diameter is larger than the thickness d in the region of the inner diameter. The outer, upwardly and downwardly facing front surfaces 40, 41 are provided for pressing against the adjacent filtering disc or discs or against an inner shoulder bearing surface of the filter disc holder 11, or of the spacing ring 26, as the case may be. At the transition between the outer and the inner front surfaces a groove 44 is cut and is connected with the inwardly facing surface 48 of the ring 22 by several radially running cutouts, of which only two cutouts 45 and 46 are provided with reference numerals. The groove 44 and the cutouts, including the numbered cutouts 45 and 46, have the effect that the inner front surfaces of the ring are divided into several partial surfaces, for example, into the partial surfaces 50, 51. When a filtering set is assembled with the accessory sealing-and-spacer rings, these partial surfaces are pressed into the filtering disc 17, for example, as shown in FIG. 3. This has the result that the disc 17 is not only held by the smooth outer front surface 40 or 41, but also supplementarily by the partial surfaces which press into the disc 17 like teeth and prevent any sliding. Furthermore, the lower pressure which exists between the partial surfaces which are recessed, with respect to the outer front surfaces, has the result that the pressure increases radially in the direction of the edge of the filtering discs so that water being pressed through the filtering discs cannot exude from the discs in the radial direction. Finally, the groove 44 and the radial cutouts, including the cutouts 45, 46, form channels through which any water flowing outwardly within the filtering disc 17, for example, in the radial direction and which is held back by the pressure of the sealing rings 21 and 22 acting upon the disc 17 can flow back into the storage volume 56 surrounded by the spacer ring 21.

In a practically tested embodiment of the new filtering device, the filtering discs 16, 17 and 17 inserted in the holder 11 and the appropriate sealing-and-spacing rings 20, 22 and 23 have a diameter of approximately 50 mm. The effective diameter of the filtering disc 32 is only approximately 25 mm. For the filtration of approximately 100 cm$^3$ water per minute, the polluted raw water must be presented to the inlet stud or conduit 14 under a gauge pressure of from about 2.5 to about 4 atmospheres. Suitable manual pumps, which can provide the required pressure, are commercially available and known to any expert. As experience has shown, one set of filters can satisfactorily clean 5 to 6 liters of very heavily polluted water, 5 to 6 liters corresponding to the emergency rations for a man sufficient for from 3 to about 4 days. In order to facilitate the exchange of filtering discs 16, 17 and 18, these discs are preferably prepressed by the manufacturer to include the sealing-and-spacer rings 20, 21, 22 and 23 and are enclosed in a protective foil.

It is clear that it is possible without difficulty to adapt the described filtering system to particular operational conditions. This is especially true for the kind and sequence of the filtering discs used, as well as for the dimensions of the discs and spacer rings.

In the practical experimentation of the effectiveness of the new filtering device, the following quantitative data were obtained.

Example 1

For testing the chemical effectiveness of the new filtering device, seawater from the North Sea containing 10.4 g sodium and 17.1 g of chlorine per 1000 cc was filtered. In the filtered seawater and in the same volume 10.2 g sodium, but only 1.91 g chlorine could be found.

The same test was repeated with seawater previously enriched in sodium chloride and therefore containing 20.23 g of sodium and 32.27 g of chlorine per 1000 cc. After filtration, the content of sodium had dropped to 19.83 g and the content of chlorine to only 0.85 g in the same volume. This means practically that because of the effective removal of chlorine in the filtration, the remaining sodium chloride content of the water can be reduced to less than 1%.

Example 2

For testing the possible sterilization by means of a new filtering device, human urine was filtered. In this test the number of determinable germs could be reduced by a factor lying between $10^2$ and $10^4$.

In another series of tests the germ count of several bacterial cultures was measured before and after filtration. In a first series of tests the raw water contained a relative germ count of $10^4$ *Serratia marcescens*, $8 \times 10^4$ germs of Micrococcus sp. and $4 \times 10^4$ germs of *Bacillus cereus* per cm$^3$. In a second series of tests the germ count was larger by approximately one order of magnitude, i.e. $4 \times 10^6$ germs or $1 \times 10^6$ germs or $6 \times 10^4$ germs, respectively, all relative to 1 cm$^3$ of the raw water. After the filtration of 400 cm$^3$ of this raw water, the two series of tests showed only a germ count of less than 1 germ *Serratia marcescens* and less than 10 germs Micrococcus sp. or *Bacillus cereus*. These results are the more remarkable because they show that even the relatively small bacteria *Serratia marcescens* are practically completely filtered out of the polluted water. It is clear that it is also possible, using the new filtering device, to add predetermined chemicals to the raw water to be filtered for an effective ion exchange as is known to any expert.

It is to be appreciated that the foregoing description and accompanying illustrations have been given by way of example. Many variants and other embodiments are possible within the spirit and scope of the invention, the scope being defined in the appended claims.

What is claimed is:

1. A filter package for assembly in a holder of an influx container for treatment of potable water, comprising a series of spaced apart filters of varying grades fixedly positioned along a series flow path, each of said filters having a perimeter intercalated by annular sealing and spacing ring means in form of rings each having a region of increased thickness about its outer periphery, each of said rings including plural channel means defined by recessed opposed front surfaces in a region adjacent said region of increased thickness, said plural channel means serving to conduct water flowing radially in said filters out of said filters away from said filters and back to the storage volume to be recycled therethrough along the series flow path.

2. A filter package as claimed in claim 1, wherein said region of increased thickness defines oppositely disposed axially extending front surface sealing means.

3. A filter package as claimed in claim 2, in which the oppositely extending front surface sealing means of said annular ring means compact the perimeters of said filters.

4. A filter package as claimed in claim 2, in which said plural channel means communicate with an annular groove.

5. A filter package as claimed in claim 1, including a multi-part housing having inlet and outlet means for emission and discharge of water from said housing, at least one element of said housing comprising axially extending means serving to receive a filter package therein, said package including said filters of varying grades and said annular ring means, and further including means for retaining said filter package within said one element of said multi-part housing.

6. A filter package as claimed in claim 5, in which the axially extending means serving to receive the filter package further includes a constricted throat area.

7. An apparatus as claimed in claim 6, in which the said outlet means of said housing further includes a cylindrical member having a divergent area complemental to said constricted throat area of the axially extending means serving to receive the filter package.

8. An apparatus as claimed in claim 6, in which the said cylindrical member includes a surface portion arranged to receive a further filter.

* * * * *